E. COMPTON.
DRAFT EQUALIZER.
APPLICATION FILED NOV. 30, 1910.
1,014,121.
Patented Jan. 9, 1912.
2 SHEETS—SHEET 1.
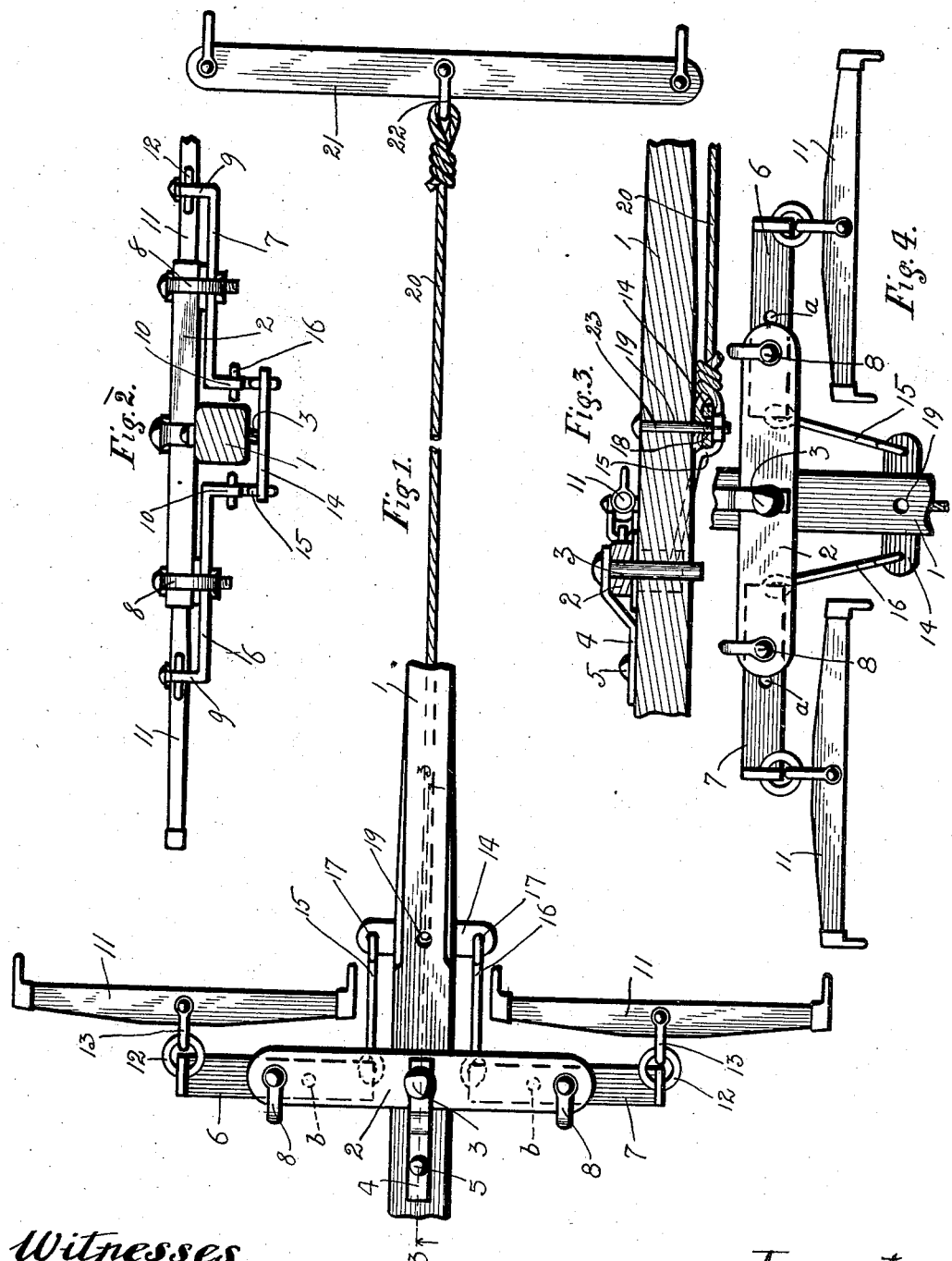
Witnesses.
M. B. Goldman
A. A. Thomas
Inventor.
Everett Compton
by Wallace R. Lane Atty

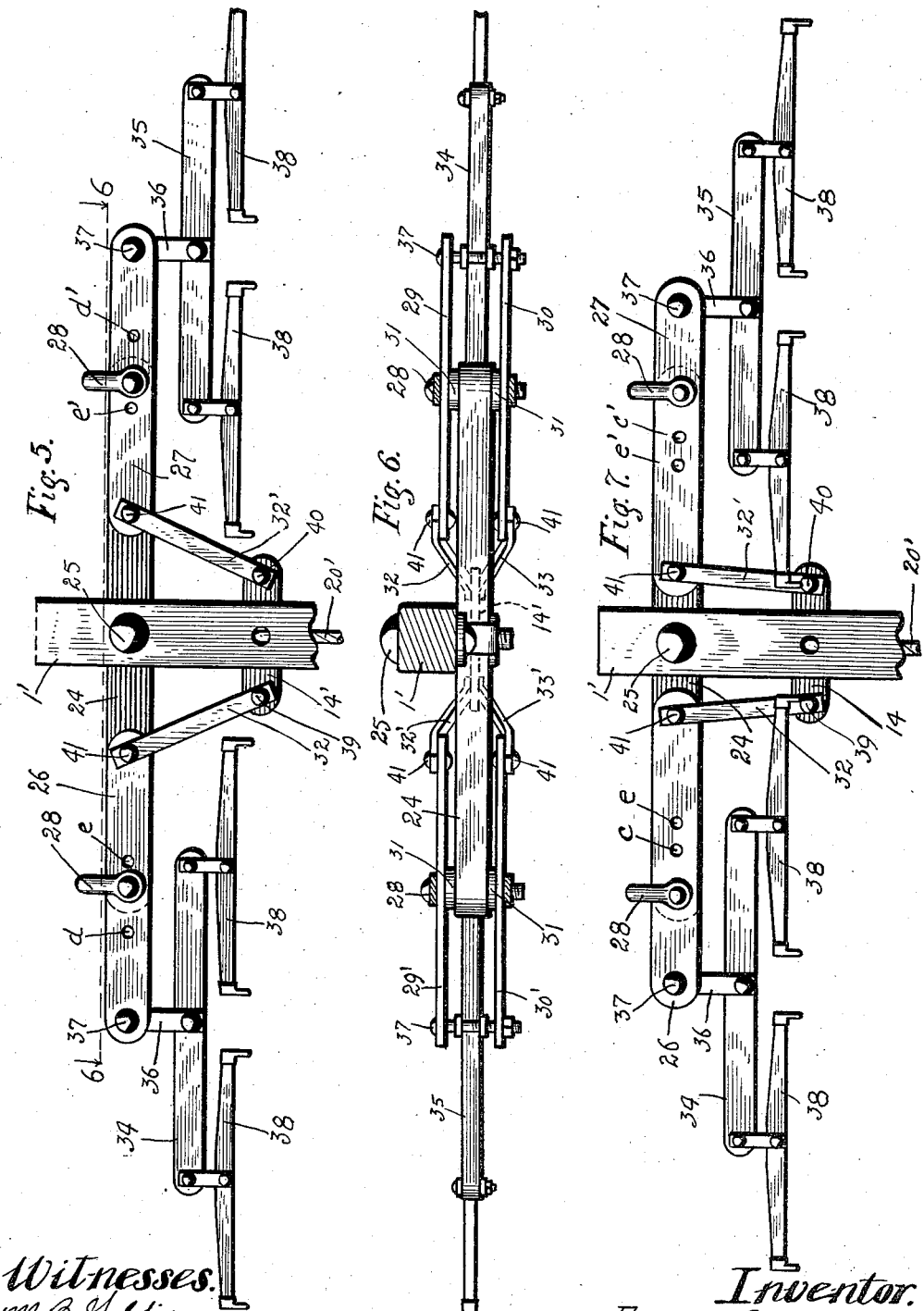

UNITED STATES PATENT OFFICE.

EVERETT COMPTON, OF EARLHAM, IOWA.

DRAFT-EQUALIZER.

1,014,121.  Specification of Letters Patent.  Patented Jan. 9, 1912.

Application filed November 30, 1910. Serial No. 594,846.

*To all whom it may concern:*

Be it known that I, EVERETT COMPTON, a citizen of the United States, residing at Earlham, county of Madison, and State of Iowa, have invented a new and useful Improvement in Draft-Equalizers, of which the following is a specification.

The object of my invention is to provide a draft equalizer for apportioning the draft equally between the rear and front teams, said draft equalizer being adjustable to accommodate a rear team or teams only.

Referring to the accompanying drawings: Figure 1 shows an embodiment of my invention for accommodating four (4) horses, two (2) in the rear and two (2) in front, Fig. 2 is a rear view of the arrangement as shown in Fig. 1, certain of the parts at the right of the figure being broken away, Fig. 3 is a longitudinal sectional view taken substantially on line 3—3 of Fig. 1, Fig. 4 is a view similar to the left-hand portion of Fig. 1, except that the draft levers are adjusted to accommodate two (2) horses in the rear and four (4) horses in the front, Fig. 5 is a modification arranged to distribute the draft between eight (8) horses, four (4) in the rear and four (4) in front, Fig. 6 is a rear view of Fig. 5 taken substantially on line 6—6 of Fig. 5, and Fig. 7 is a view similar to Fig. 5 showing the same arrangement, except that the draft levers are adjusted to accommodate six (6) horses, four (4) in the rear and two (2) in front.

Referring first to Figs. 1, 2, 3 and 4, the wagon pole or tongue 1 has pivoted thereto the main equalizing bar 2 by means of the bolt or pivot 3. Suitable means, such as the spring member 4 secured to the pole at 5 and at its free end engaging the bolt 3, may be used for preventing accidental dislodgment of the bolt. To the ends of the equalizing bar 2 are pivoted the levers 6 and 7 by means of the clevises 8, the pins of the clevises forming the pivot points for the levers. In the arrangement shown in Figs. 1 to 4 inclusive, the levers 6 and 7 are at their outer ends provided with the up-turned flanges 9 and at their inner ends with the down-turned flanges 10, as best shown in Fig. 3. To the outer ends of the levers 6 and 7 are pivotally connected whiffletrees 11, in any suitable manner—as by means of the rings 12 and clevises 13. In the arrangement shown in Figs. 1 to 4 inclusive, the whiffletrees 11 are in the form of single-trees. A draft plate 14 is arranged transversely of the pole or tongue 1 and is connected to the inner ends of the levers 6 and 7 through the links 15 and 16 respectively. These links engage the down-turned flanges 10 of the levers, and, at their outer ends, pass through the openings 17 in the plate 14. The openings 17 are substantially at equal distances from the center of the plate 14. At its central point, the plate is provided with an opening 18 adapted to be brought into alinement with the opening 19 in the pole. The purpose of this arrangement will be presently described. A draft rope, chain or cable 20 is, at one end, connected to the plate 14, as by passing through the central opening 18 in the plate. The other end of the cable is connected to the whiffletree 21 in any suitable manner, as by being looped through the clevis 22 which is pivoted to the whiffletree.

The operation of the construction shown in Fig. 1 will now be clearly understood from the above detailed description.

It will be noticed that the pivot axes of the levers 6 and 7 are at the center of the levers. According to the arrangement, the draft of the rear horses or teams should be substantially equal to the draft of the front horses or teams. The point of draft of the rear team (it will be understood that by a team is meant two (2) horses) is communicated to the levers 6 and 7 at the outer ends of the levers, while the draft of the front team is communicated to the levers at the inner ends thereof. In this way, the draft of the front team acts, or is balanced, against the draft of the rear team, the draft of both teams being communicated to the main equalizing bar 2 at the points of connection between said bar and the levers 6 and 7. The characteristic feature of my invention resides in the arrangement whereby the draft plate 14 may be pivotally connected to the pole, so as to adapt the equalizer for a rear team only, and to distribute the draft between the horses of the rear team or teams. When both the rear and front teams are used, the draft plate 14 is capable of bodily movement relative to the pole 1. In order to adjust the equalizer of my invention for a rear team or teams only, the draft cable is disconnected from the plate 14 and a pin or bolt 23 is inserted through the opening 19 in the pole and the alined opening 18 in the plate 14. This pivotal connection between the plate 14 and the pole 1 causes the draft of one horse of the rear team to be balanced against the draft of the other horse.

In Fig. 4, the pivot pins of the clevises 8 pass through the openings $b$ of the levers 6 and 7. These openings are indicated in dotted lines in Fig. 1. In the particular embodiment illustrated in Figs. 1 and 4, the levers 6 and 7 are each provided with openings $a$ and $b$, the openings $a$ being at the center of the levers, while the openings $b$ are at a point which divides the effective length of each lever into two parts in the ratio of two to one. In this way the draft equalizer apportions the draft among the two (2) rear horses and the four (4) front horses. Since the parts shown in Fig. 4 are the same as the corresponding parts shown in Fig. 1, the detailed description above given of Fig. 1 applies equally to Fig. 4.

In Figs. 5, 6 and 7, my new draft equalizer is shown in a form designed to be used for heavy loads, as, for instance, excavating machines, road graders and the like. In these figures, the pole 1' has connected thereto the main equalizing bar 24 by means of the bolt or pin 25. To the ends of the bar 24 are pivoted the levers 26 and 27 in any suitable manner, as by the clevises 28, the pins or bolts of which form the points of pivot for the levers. In this modification, the lever 26 comprises a pair of bars 29 and 30, one arranged on either side of the main equalizing bar 24, as shown in Fig. 6. Similarly, the lever 27 comprises a pair of arms 29' and 30' arranged one above and one below the main bar 24. The arms of the levers are spaced from the equalizing bar 24 by means of washers 31. To the inner ends of the arms 29 and 30 are pivoted the rear ends of the links 32 and 33. Similarly, the rear ends of the links 32' and 33' are pivoted to the inner ends of the arms 29' and 30' which comprise the lever 27. The arms of the lever 26 are provided with alined openings $c$, $d$ and $e$. The arms of the lever 27 are provided with alined openings $c'$, $d'$ and $e'$. To the outer ends of the levers 26 and 27 are pivoted the whiffletrees 34 and 35 respectively in any suitable manner, as by means of the plates 26 and bolts or pins 37. The whiffletrees 34 and 35 are shown in the form of double-trees, to which are suitably pivoted the swingle-trees 38. The front ends of the links 32 and 33 are pivoted to the draft plate 14' by the pin 39, while the front ends of the similar arms 32' and 33' are pivoted to the other end of the plate 14' by the pin 40. The draft rope or cable 20' is adapted to be connected to the draft plate 14' in a manner similar to the cable 20 in Fig. 1. It will be seen from Fig. 6 that the draft plate 14' lies in a plane passing substantially through the longitudinal center of the main equalizing bar 24 and the whiffletrees 34 and 35, whereby the lines of draft of all of the teams are substantially in the same plane. The specific arrangement shown in Fig. 5 distributes the draft equally among eight (8) horses, four (4) in the rear and four (4) in front. It will be noticed that in this arrangement the pivot pins of the clevises 28 pass through the holes or openings $c$ and $c'$ of the levers 26 and 27. These openings are arranged substantially at the central point of the levers. The openings $d$ and $d'$ of the levers 26 and 27 divide the effective lengths of the levers into two parts in the ratio of one to two. That is to say, the distance between the axes of the pins 37 and the openings $d'$ is half as great as distance between the openings $d$ and the pivot pins 41 which establish the connection between the levers and the links. When the levers 26 and 27 are pivoted to the main equalizing bar 24 through the openings $d$ and $d'$ (as shown in Fig. 7), the draft equalizer apportions the draft equally among four horses in the rear and two horses in front, or eight horses in the rear and four horses in front. The openings $e$ and $e'$ in the levers 26 and 27 divide the effective length of each lever in the ratio of three to two. That is to say, the distance between the openings $e$ or $e'$ and the outer pivot pin 37 is one and one-half times the distance between the opening and the inner pivot pin 41. When, therefore, the levers 26 and 27 are connected to the main equalizing bar 24 through the openings $e$ and $e'$, the equalizer apportions the draft equally among ten horses,—four in the rear and six in front. By arranging the openings at other distances, the draft may be distributed among the front and rear horses arranged in the desired manner. It is, of course, to be understood that the arrangement shown in Figs. 5, 6 and 7 is adjustable to accommodate rear teams only and to equally apportion the draft among the horses by disconnecting the rope or cable 20' and passing a pin or bolt through the alined openings of the pole 1' and the draft plate 14', as previously described in detail in connection with Fig. 1.

Having thus described my invention, what I claim as new and desire to secure by Letters Patent of the United States is:

In a draft equalizer, the combination of a pole, an equalizing bar pivoted thereto, a pair of levers pivoted to the ends of said equalizing bar, a draft plate arranged transversely of the pole and movable relatively thereto when disconnected from the pole, means for connecting the inner ends of said levers with the ends of said plate, a draft member adapted to be connected at one end to said plate, whiffletrees connected to the outer ends of said levers and said member, and means for pivotally connecting said plate to said pole, whereby the inner ends of said levers become connected together through said plate and are adapted to adjust themselves about the pivot point of said plate independently of said equalizing bar.

In witness whereof, I hereunto subscribe my name this 1st day of November, A. D. 1910.

EVERETT COMPTON.

Witnesses:
CLARENCE J. LOFTUS,
ELIZABETH SKAHILL.